United States Patent [19]
Chiu et al.

[11] Patent Number: 5,346,424
[45] Date of Patent: Sep. 13, 1994

[54] AUTOMATIC SIZE-GRADING AND SHRIMP PEELING MACHINERY

[75] Inventors: Yi-Chich Chiu, Taoyuan; Hann-Yun Wu; Su-Ming Chen, both of Taipei; Few-Long Wu, Ilan Hsien; Ming-Yih Chang, Taipei, all of Taiwan

[73] Assignee: Horng Shen Machinery Co., Ltd., Ilan Hsien, Taiwan

[21] Appl. No.: 110,061

[22] Filed: Aug. 20, 1993

[51] Int. Cl.⁵ ............................................. A22C 29/02
[52] U.S. Cl. .............................................. 452/5; 452/2; 452/184
[58] Field of Search ................................ 452/5, 2, 184

[56] References Cited

U.S. PATENT DOCUMENTS

| | | | |
|---|---|---|---|
| 2,537,355 | 1/1951 | Lapeyre et al. | 452/5 |
| 3,703,746 | 11/1972 | Jones, Jr. | 452/5 |
| 3,706,113 | 12/1972 | Lapeyre et al. | 452/5 |
| 3,740,795 | 6/1973 | Cox | 452/5 |
| 4,393,544 | 7/1983 | Lapeyre et al. | 452/5 |
| 4,400,849 | 8/1983 | Dell | 452/5 |
| 4,941,233 | 7/1990 | Allain | 452/5 |
| 5,064,400 | 11/1991 | Stipe | 452/5 |
| 5,120,265 | 6/1992 | Ledet et al. | 452/5 |

FOREIGN PATENT DOCUMENTS

79349  6/1955  Denmark .................. 452/5

*Primary Examiner*—Willis Little
*Attorney, Agent, or Firm*—W. Wayne Liauh

[57] ABSTRACT

An automatic size-grading and shrimp peeling machine for shrimps; the automatic grading machine includes a plate-partition conveyer mounted to a slanting platform; the slanting platform is mounted with at least three conveying screw shafts coupled with the plate-partition conveyer and a plurality of feeding pipes of peeling machine. The automatic grading machine is mounted on a machine supporting frame so as to have all feeding ports mounted over the peeling machine, which includes at least three peeling units; each unit includes a large swing peeling roller and two small revolving peeling rollers; a pressing roller and at least one squeezing wheel are mounted between two small revolving peeling rollers. The squeezing wheel and the pressing roller are mounted in parallel each other, but perpendicular to the small revolving peeling rollers.

7 Claims, 9 Drawing Sheets

AUTOMATIC SIZE-GRADING AND SHRIMP PEELING MACHINERY

BACKGROUND OF THE INVENTION

The frozen shrimp is the prim supply source for the peeled shrimps, the shrimp dumplings and the shrimp balls; before preparing the aforesaid food, the shell of a shrimp has to be removed. Currently, the peeling work is done manually; such method of removing the shell not only affects the peeling speed and the yield, but also results in bacterial contamination and dirt contamination to jeopardize the freshment and quality of the peeled shrimps; finally, the shrimps might be rejected by a buyer; the rejection percentage once raised up to 28.1%; the supplier reputation would be harmed seriously. Recently, the society has been changed from the previous farm society, the cost of manpower has been raised considerably to cause a shortage in manpower; moreover, the shrimp peeling workers are subject to being injured by shrimp shell or being contaminated by shrimps. In order to improve the productivity and quality, and to reduce the contamination during peeling process, a shrimp peeling machinery has to be developed. Some conventional shrimp peeling machines have been disclosed, such as U.S. Pat. Nos. 3,975,797, 4,400,849, 5,108,342, and 5,120,265.etal.; all of the aforesaid peeling machines for shrimps have their drawbacks in one way or another, and therefore none of them has been used widely. As a result, the inventor has, by referring to the prior art of the kind, developed a shrimp peeling machinery, in which the drawbacks of the prior art have been improved.

Figure 1:
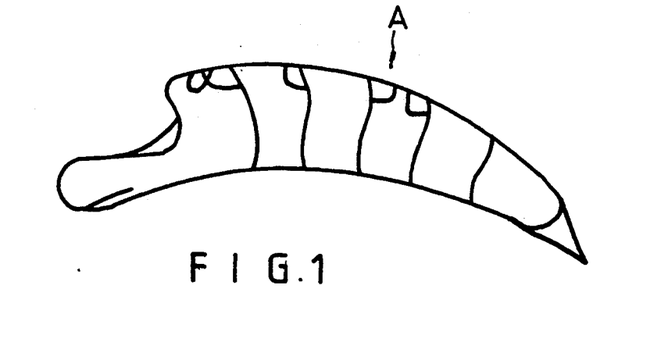
FIG. 1 illustrates a shrimp body after the shell thereof being removed.

No matter a frozen shrimp or a fresh shrimp would look like, after peeling process, a peeled shrimp as shown in FIG. 1, which includes a tail section, six-ring body section and a head section; shrimps are processed through a conventional roller-type shrimp peeling machinery would have a low yield with more or less fragmental shell therein. A shrimp peeling machinery usually includes a plurality of peeling rollers to remove the shell of a shrimp, such as U.S. Pat. Nos. 4,400,849, 5,108,342, and 5,120,265; however, the peeling result would be reduced in the event of the peeling rollers being too large or small; in other words, if the peeling rollers are too large or small, the yield will be low because of a low peeling efficiency. A large peeling structure can provide a stronger peeling force, but the tail section of a shrimp is susceptible to being cut off by such a machine; in other words, the possibility of cutting off the tail section of a shrimp is in proportion to the size of the peeling rollers. If the size of the peeling rollers is small, the peeling force will be reduced or too little to remove a shell; however, the percentage of the tail section to be cut off will be reduced, but the percentage of fragmental shell left in the peeled shrimp will be high; such fragmental shell problem has to be solved through manual operation. The size of shrimps has a close relation to the size of the peeling rollers on the upper and the lower rows of the rollers, and to the angle formed between the upper and the lower rows of the rollers. Generally, the rollers in the conventional shrimp peeling machinery have a larger contained angle between the upper and the lower rows of rollers; in other words, a normal upper row roller will be unable to remove the shrimp shell; to improve such problem, a swinging spring or the like is mounted between the upper and lower row rollers, such as shown in U.S. Pat. Nos. 4,400,849, and 5,120,265; unfortunately, the tail section and the ring part nearing the tail section are susceptible to being cut off to cause a lower yield.

SUMMARY OF THE INVENTION

This invention relates to an automatic size-grading and shrimp peeling machinery, and it comprises a plate-partition conveyer, a slanting platform, a machine supporting frame, and a plurality of feeding pipes for the shrimp peeling machinery; the plate-partition conveyer is fastened to the slanting platform, over which at least three conveying screw shafts and three feeding pipes are mounted. The whole automatic grading machine is mounted to the machine supporting frame. The peeling machine includes a plurality of small and large peeling rollers, of squeezing wheels, weighted racks, squeezing belts and weight assemblies. The peeling machine includes at least three peeling units; each such unit includes a large swing peeling roller, two small revolving peeling rollers mounted over both sides of the large swing peeling roller, at least one squeezing wheel mounted between the two small revolving peeling rollers by means of a bearing block, and a spindle; one end of the spindle is mounted with a belt pulley to be coupled to a squeezing-wheel motor. The spindle may not be mounted to the bearing block, but is mounted on a lifting arm by means of bearing sleeves; a ⊓-shaped regulating frame is also mounted to the spindle; a weighted rack with a spring and an adjusting screw is mounted in the gravity center of the ⊓-shaped regulating frame. The squeezing wheel is a convex or a grooved squeezing wheel. When more than one squeezing wheel is used, a squeezing belt is mounted around all such squeezing wheels; the squeezing wheel supported with a spindle is mounted with a weight assembly on the bearing block of the spindle; the weight assembly is perpendicularly mounted to the spindle. The weight assembly has an adjusting rod with an adjusting knob, being in parallel with the squeezing wheels. The front ends of the peeling rollers are mounted with pressing rollers being perpendicular to the small revolving peeling rollers and being parallel to the squeezing wheel. The size-grading operation is to be done by means of the space between the conveying screw shaft and the slanting platform; the swinging of the large roller and revolution of the small rollers can provide a rolling-and-squeezing force; the pressing roller is used to loosen the shrimp meat from the shell before the shrimps being processed through the squeezing wheel to have the shrimp meat squeezed out of the shell; then, the peeling rollers will cause the shell to separate from the shrimp meat. The features of the present invention are that it has a simple structure, a high yield, a low contamination and a complete peeled shrimp.

BRIEF DESCRIPTION OF THE DRAWINGS

FIG. 3-1 is a top view of the automatic grading machine according to the present invention.

FIG. 3-2 is a top view of the shrimp peeling machinery according to the present invention.

FIG. 5-1 is a fragmental perspective view of the peeling machine according to the present invention.

FIG. 5-2 is a fragmental side view of the peeling machine according to the present invention.

FIG. 5-3 is a side view of the adjusting assembly of the small and large peeling rollers in the peeling machine of the present invention.

FIG. 5-4 is a fragmental perspective view of the peeling machine of the present invention.

FIG. 5-5 is a perspective view of a grooved squeezing wheel with the weighted rack in the peeling machine of the present invention.

FIG. 5-6 is a perspective view of a convex squeezing wheel with the weighted rack in the peeling machine of the present invention.

FIG. 5-7 is a plan view of a granulated squeezing wheel in the peeling machine of the present invention.

FIG. 5-8 is a plan view of a slanting-rib squeezing wheel in the peeling machine of the present invention.

FIG. 5-9 is a plan view of a V-shaped rib squeezing wheel in the peeling machine of the present invention.

FIG. 5-10 is a plan view of a regular squeezing wheel in the peeling machine of the present invention.

FIG. 5-11 is a perspective view of a convex squeezing wheel mounted with a weight assembly in the peeling machine of the present invention.

FIG. 5-12 is a front view of the convex squeezing wheel mounted with a weight assembly in the peeling machine of the present invention.

FIG. 5-13 is a perspective view of the grooved squeezing wheel mounted with a weight assembly in the peeling machine of the present invention.

FIG. 5-14 is another perspective view of the grooved squeezing wheel mounted with a weight assembly in the peeling machine of the present invention.

DETAILED DESCRIPTION

Figure 2:
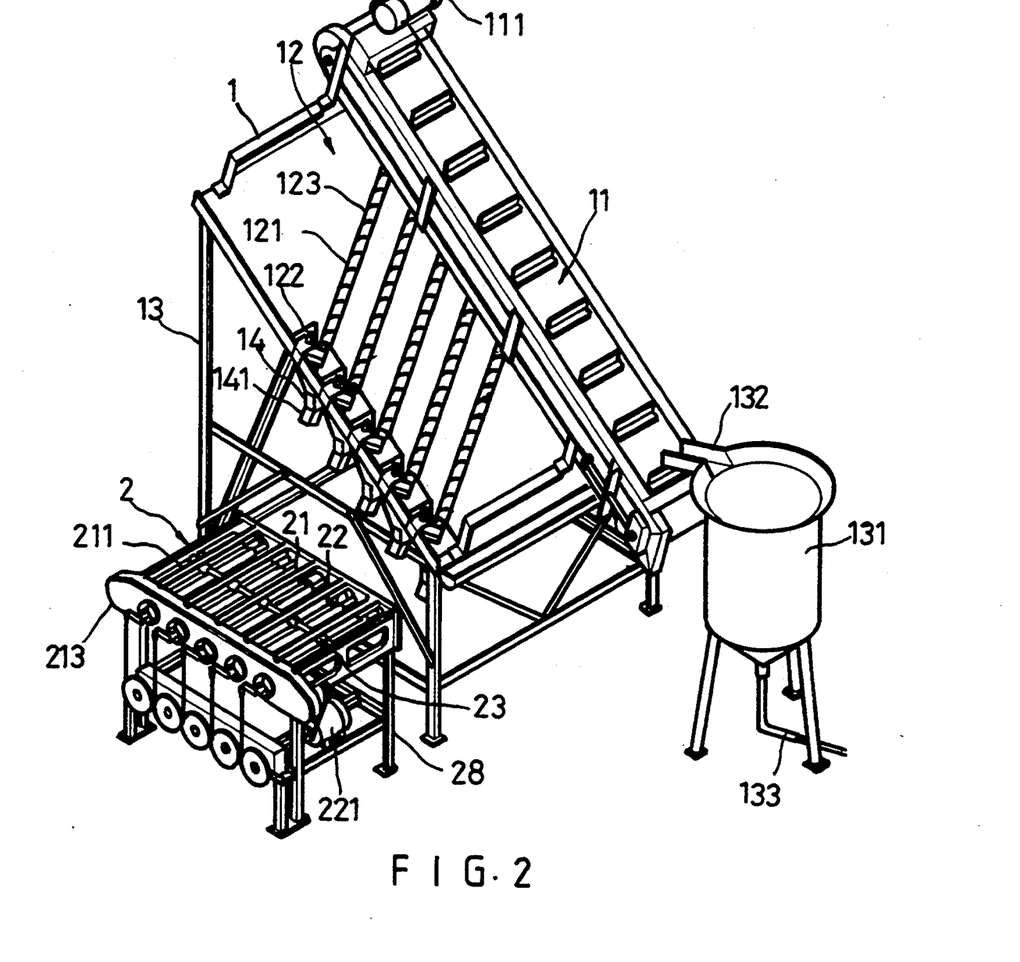
FIG. 2 is a perspective view of an embodiment according to the present invention.
Figure 4:
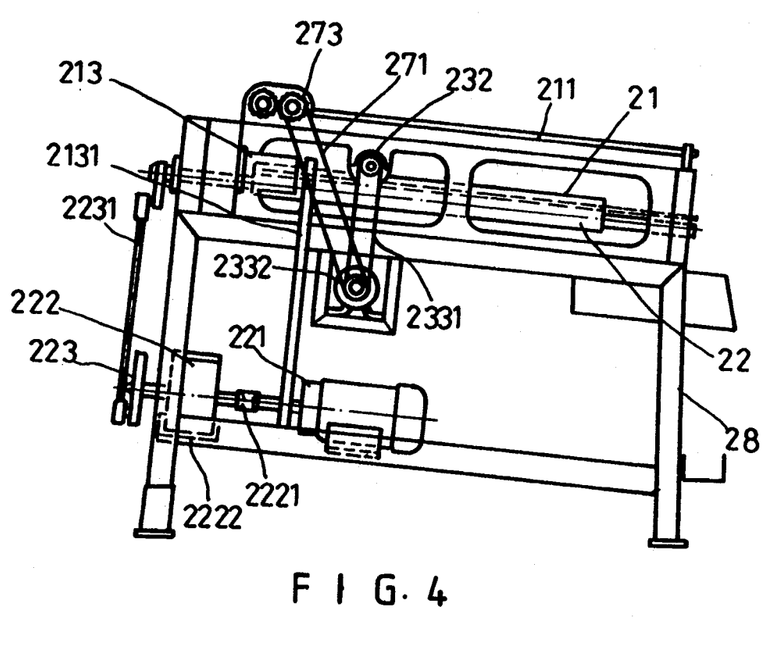
FIG. 4 is a front view of the shrimp peeling machinery according to the present invention.

Referring to FIG. 2, a perspective view of an embodiment according to the present invention comprises an automatic grading machine 1 and a peeling machine 2. The machine 2 includes a plate-partition conveyer 11, a slanting platform 12, a machine supporting frame 13, and a plurality of feeding pipes 14 of the peeling machine. The plate-partition conveyer 11 is fixedly mounted to a slanting platform 12 (as shown in FIG. 3-1), and is driven to move with a conveyer motor 111. The slanting platform 12 is connected with at least three conveying screw shafts 121, which are connected with the plate-partition conveyer 11 and the feeding pipes 14 of peeling machine. The whole automatic grading machine 1 is fastened to the machine supporting frame 13; the feeding ports 141 of the feeding pipes 14 are right over the peeling machine 2. The conveying screw-shaft 121 is driven with the screw shaft motor 113, which is mounted to a screw transmission shaft 126 mounted with transmission-shaft belt pulleys 125. The transmission-shaft belt pulley 125 and the screw-transmission-shaft belt pulley 127 are mounted at an angle of 75, being coupled each other with a round transmission shaft 124. The peeling machine 2 (as shown in FIGS. 5-1 to 5-14 and 3-2) includes a plurality of small revolving peeling rollers 21, large swing peeling rollers 22, squeezing wheels 23, weighted racks 24, squeezing peeling belts 25, weight assemblies 26, and pressing rollers 27. The peeling machine 2 has at least three or more than three peeling units; each peeling unit includes a large swing peeling roller 22 (as shown in FIGS. 5-1 and 5-2) and two small revolving peeling rollers 21 mounted on both sides of the large swing peeling roller 22 respectively. One or more than one squeezing wheel 23 is mounted between the two small revolving peeling rollers 21. The squeezing wheels 23 are mounted around a spindle 231, which is supported on both ends with two bearing blocks 232. One end of spindle 231 is mounted with a belt pulley 233, on which a driving belt 2331 is coupled with a squeezing-wheel motor 2332 (as shown in FIG. 4). As shown in FIGS. 5-5 and 5-6, the spindle 231 may not be fastened directly in the bearing blocks 232; instead, two bearing sleeves 241 are mounted on the spindle but on both sides of the squeezing wheel 23 respectively; a lifting arm 242 and a ⊓-shaped regulating frame 243 are fixedly mounted on the bearing sleeves 241. The arm 242 and the frame 243 are arranged perpendicular to each other, and also to the spindle 231. The gravity center of the ⊓-shaped regulating frame 243 is mounted with a spring 244 to support a weight rack 24. The top center of the weighted rack 24 is mounted with an adjusting screw 245. When more than one squeezing wheel is used, a mounting seat 251 can be used (as shown in FIGS. 5-1 and 5-13) for mounting and supporting the squeezing wheels 23. A wheel space knob 252 on the mounting seat 251 (as shown in FIGS. 5-1 and 5-14) is used for adjusting the distance between two axes of the squeezing wheels 23. All the squeezing wheels 23 are covered around with a squeezing belt 25; the squeezing wheels 23 mounted on the spindle 231 is furnished with a weight assembly 26 mounted on the inner side of the bearing block 232. The weight assembly 26 includes a ⊓-shaped member and a ⊓-shaped member, which are arranged in perpendicular manner to each other, and fastened to the spindle 231. An adjusting rod 261 with an adjusting knob 262 is mounted to the weight assembly, being parallel to the squeezing wheel 23. Both edges of the squeezing belt 25 have equal gaps; the central portion of the belt 25 has Λ-shaped ribs (not shown). The front ends of the peeling rollers 21 and 22 are mounted with two pressing rollers 27 (as shown in FIG. 5-4) made of plastic material; and they are mounted in place with a mounting seat 275; the roller 27 are perpendicular to the squeezing wheel 23, and are driven to turn in opposite direction with a transmission belt 271, a transmission belt wheel 272, two transmission gears 273, a driving shaft 274 and a driven shaft 276. The top of a supporting rack 28 of the peeling machine 2 is mounted with the small revolving peeling rollers 21, the large swing peeling rollers 22, the squeezing wheels 23, the weighted racks 24, the squeezing belts 25 and the weight assemblies 26. Under the supporting rack 28, there are a squeezing-wheel motor 2332 (as shown in FIGS. 1 to 4) and a transmission motor 221, which is coupled with a gear box 222 and a link driving disk 223 through a transmission sleeve 2221. The gear box 222 is fastened in a ⊔-shaped base 2222. The link driving disk 223 is used to transmit a driving power to the large swing peeling roller 22 through a ball socket link 2231. A transmission belt 2131 of the chain box 213 is used for transmitting power to the chain box 213 to drive the small revolving peeling roller 21. The peeling machine 2 is a slanting apparatus, of which each unit is furnished with a water-spraying pipe 211 to provide a water conveying force to convey shrimps pressed by the pressing roller 27 to a space under the squeezing wheel 23 and between the large and small peeling rollers 22 and 21. The contained angle between the large swing peeling roller 22 and the small revolving peeling rollers 21 can be adjusted by means of a fixing screw 212 and a fixing seat 214 (as shown in FIG. 5-3). The space between the large swing peeling roller 22 and the small revolving peeling rollers 21 can adjusted by means of a fixing seat 224 and a fixing screw 225 of the roller 22; in other words, the contained angle and the space between the large and small revolving peeling rollers 22 and 21 in each unit of the automatic grading machine 1 must be adjusted for fitting the size of shrimps to be processed. The squeezing wheel 23 includes a grooved squeezing wheel and a convex squeezing wheel (as shown in FIGS. 5-6 and 5-5), which are made of rubber or metal. The function of the squeezing wheel 23 is to loosen and separate the shrimp meat and the shrimp shell; in order to improve such peeling function, the surface of the squeezing wheel 23 can be a regular surface (as shown in FIG. 5-10), or a granulated squeezing wheel 234 (as shown in FIG. 5-7), or a slanting-rib squeezing wheel 235 (as shown in FIG. 5-8), or a V-shaped-rib squeezing wheel 236 (as shown in FIG. 5-9); such squeezing wheel is driven with a D.C. (direct current) motor, of which the running speed is adjustable. The squeezing wheel 23 mounted with a weighted rack 24 (as shown in FIGS. 5-5 and 5-6) can be adjusted by using a lifting arm 242, a ⊓-shaped regulating frame 243 and an adjusting screw 245. The gap (not shown) on the edges of the squeezing belt 25 can be closed by means of the surface of a convex or grooved squeezing wheel 23. The direction of Λ-shaped ribs in the central of the belt can be the same as its moving direction, or opposite to its moving direction; in that case, the force applied to the peeling function will be different. The squeezing wheel 23 mounted with a weight assembly 26 (as shown in FIGS. 5-11 and 5-14) can be adjusted with an adjusting rod 261 and an adjusting knob 262 by changing the distance between the adjusting knob 262 and the spindle 231, i.e., the shorter the distance, the lesser the pressure.

Figure 31:
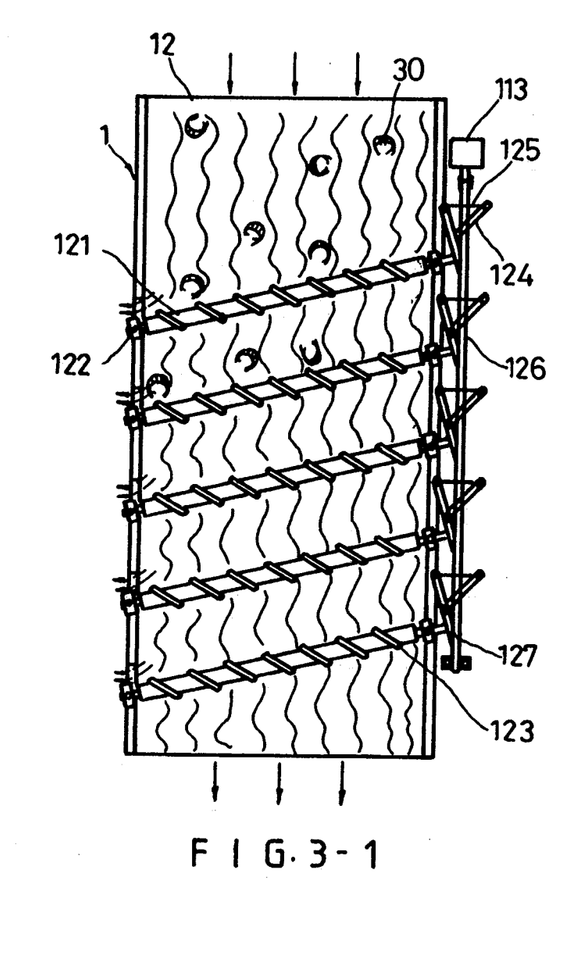
Figure 32:
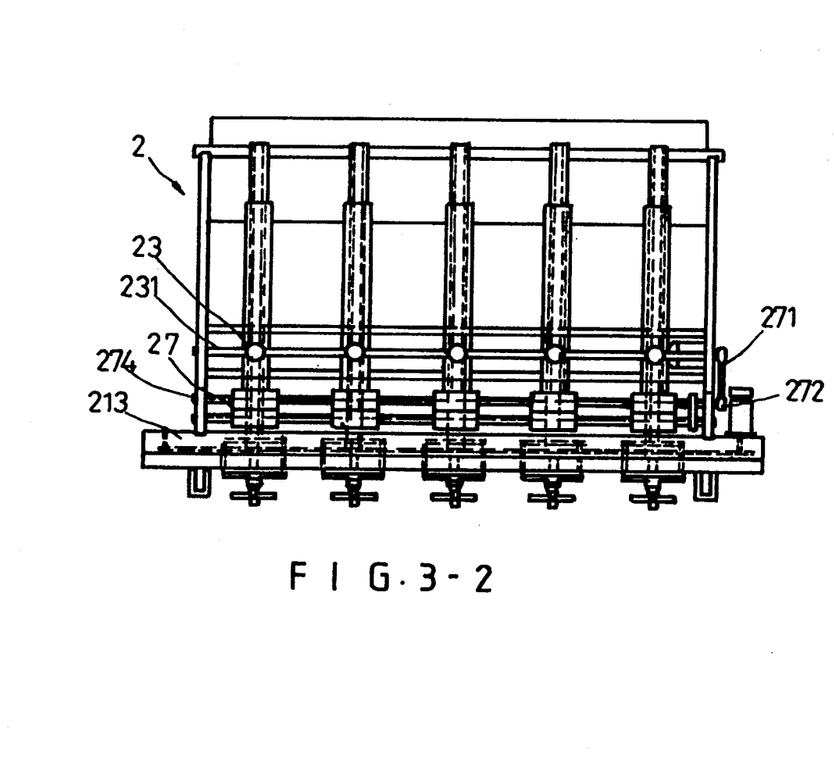
Figure 51:
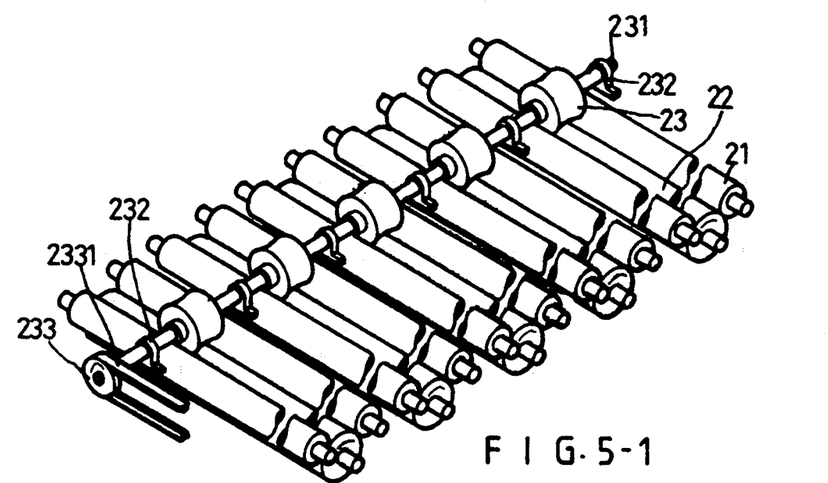
Figure 52:
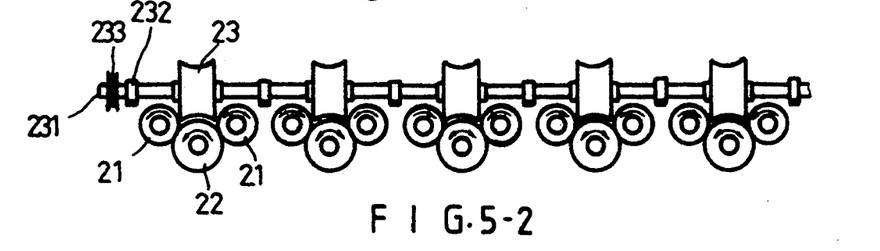
Figure 53:
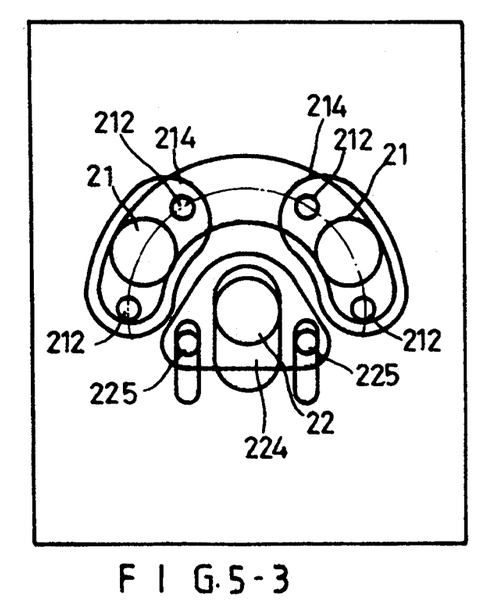
Figure 54:
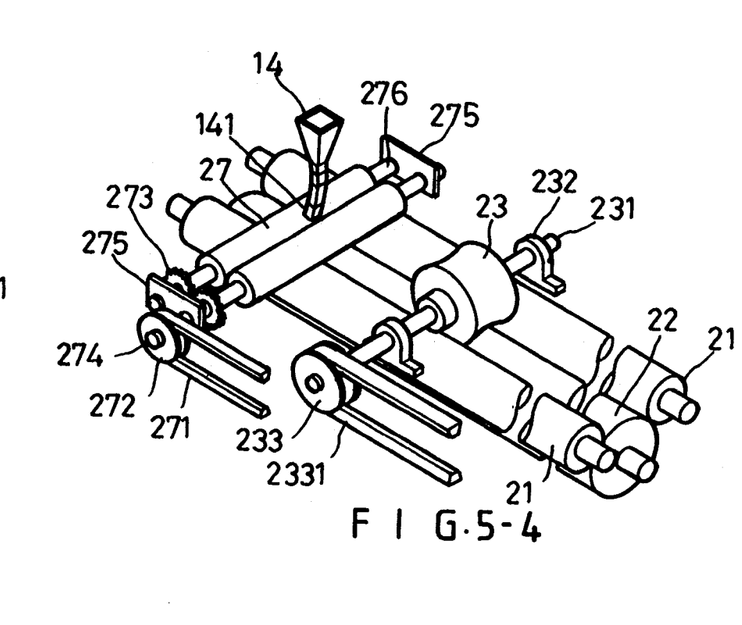
Figure 55:
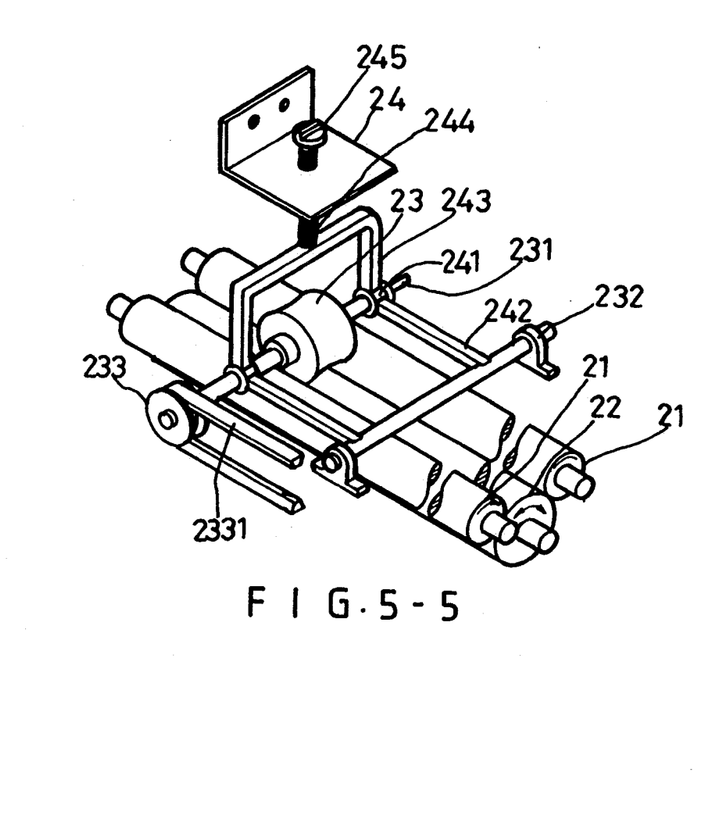
Figure 56:
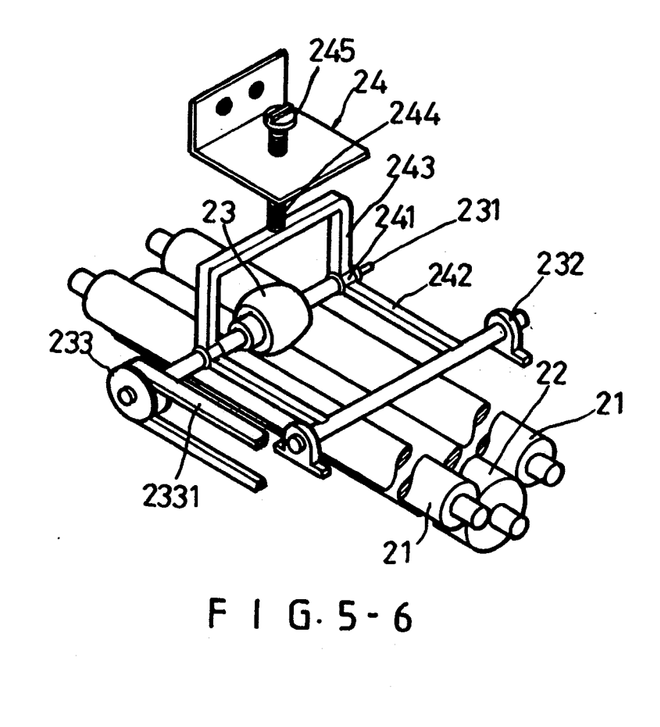
Figure 57:
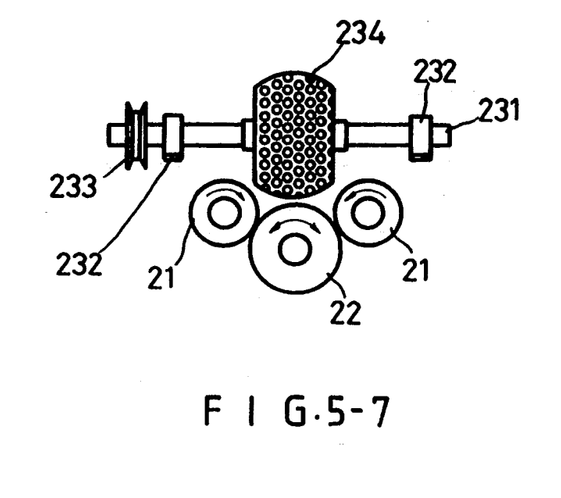
Figure 58:
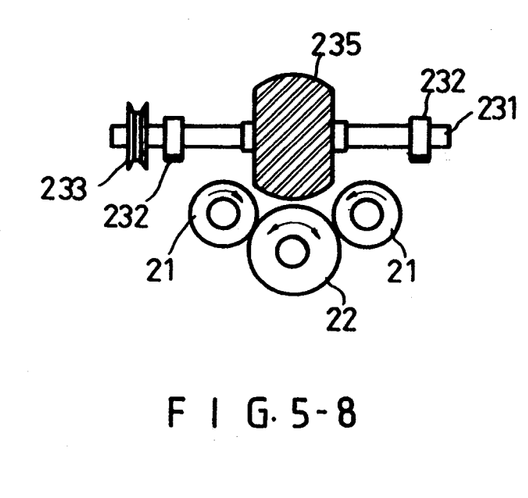
Figure 59:
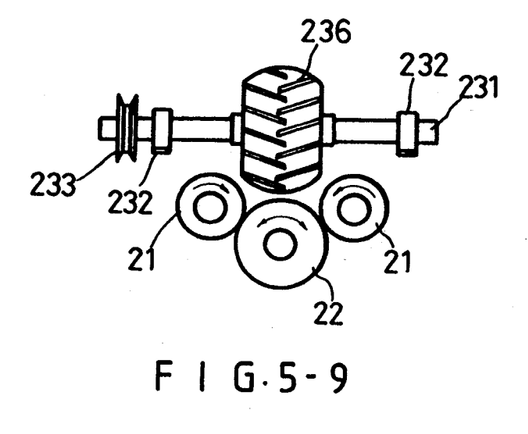
Figure 510:
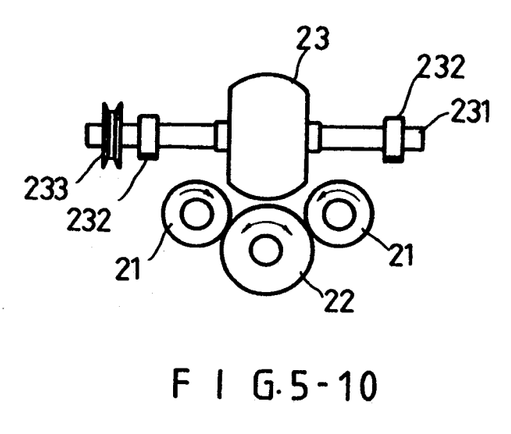
Figure 511:
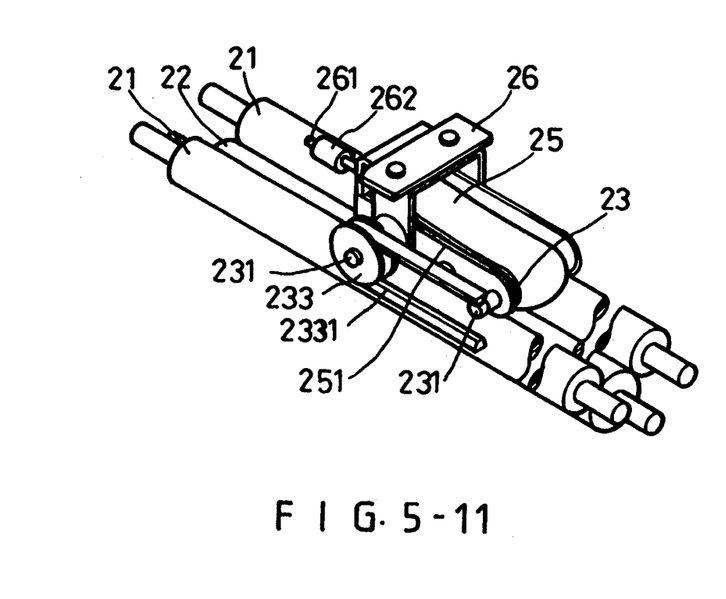
Figure 512:
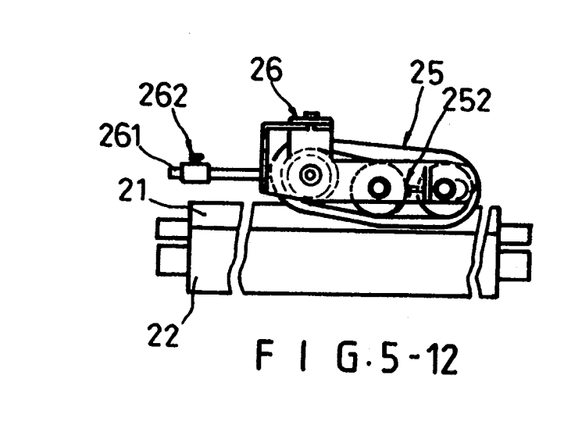
Figure 513:
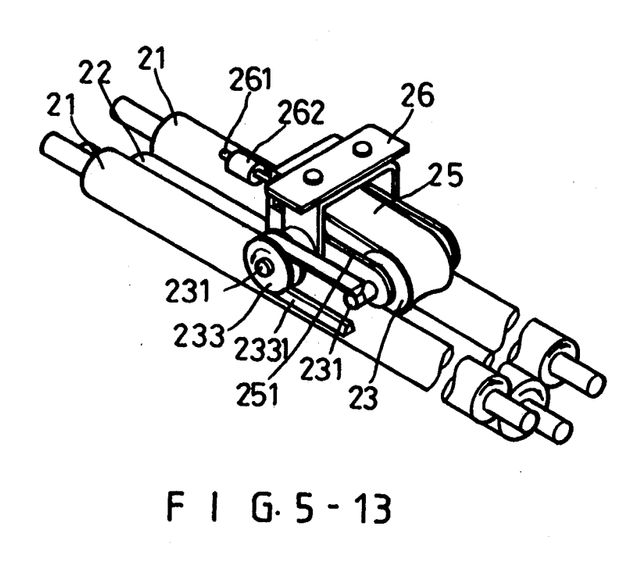
Figure 514:
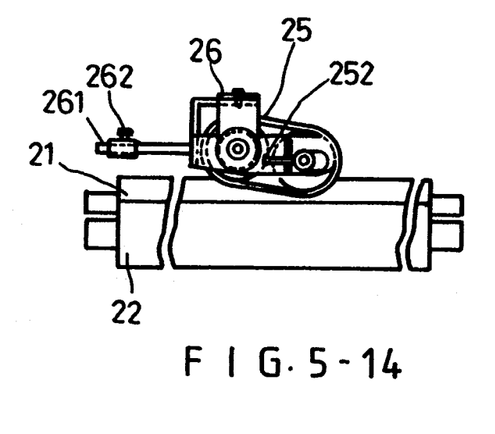

When the shrimps in the feeding tank 131 are conveyed in water from a water pipe 133 to a feeding port 132 and to the plate-partition conveyer 11, the shrimps will fall to the automatic grading machine 1, which is a down-slanting platform. The space between the conveying screw shafts 121 and space between the platform 12 and the conveying screw shaft 121 determine the grading standard. Such space can be adjusted by means of a space-adjusting knob 122 of the screw shaft 121; in other words, the space between the top conveying screw shaft 121 and the slanting platform 12 is the largest one, while the smallest space is formed with the lowest conveying screw shaft 121. When water flows downwards from the top of the slanting platform 12, the shrimps 30 (as shown in FIG. 3-1) will also flow downwards in the water; if the thickness of the shrimp body is larger than the space between the conveying screw shaft 121 and the slanting platform 12, the shrimps would be unable to pass under the conveying screw shaft 121, and then they will be pushed by the ribs 123 of the conveying screw shaft 121 to fall in a feeding pipe 14; the shrimps having such size are sorted as one grade. Usually, the shrimps are to be sorted at least into three grades, and therefore three conveying screw shafts 121 at least are installed in the machine. After the shrimps are sorted in grades, the shrimps will fall to the peeling machine 2 from the feeding ports 141 of the feeding pipes 14 respectively. Each unit of the pressing rollers 27 will press the shrimp lightly to have the shrimp meat separated from the shell thereof. The contained angle between the large and small peeling rollers can be adjusted for receiving the shrimps sorted in grades so as to elevate the peeling efficiency. The features of the peeling machine 2 are that the machine is designed and furnished with various forms of squeezing wheels 23, 234, 235 and 236. The pressing rollers 27 are used for loosening the connection between the shrimp meat and shrimp shell before the squeezing wheel being used to squeezing the shrimp meat out of the shell; then, the large and small peeling rollers 22 and 21 running at different speed will be used to apply a rolling-and-squeezing force to separate the shrimp meat from the shell thereof. When a shrimp is larger than the space between the peeling rollers and the squeezing wheel with a weighted rack, the shrimp body might overcome the force of the adjusting screw 245 of the weighted rack to cause the squeezing wheel to be lifted up so as to maintain the shrimp body in a complete condition. In the squeezing wheel 23 with a weight assembly 26, the adjusting knob 262 on the adjusting rod 261 maintains an adjustable distance with the spindle 231, i.e., the shorter the distance, the greater the pressure; the distance is varied in accordance with the size of shrimps; more than one squeezing wheel may be used simultaneously, and a gap on the edge of the squeezing belt will make the two squeezing wheels closed together. The direction of V-shaped ribs of the squeezing wheel can be the same as that of the belt, or opposite to so as to separate the shrimp meat from the shell thereof; in that case, the peeling efficiency will be elevated, and the shrimp meat will be maintained in a perfect and complete condition without any shell being left in the shrimp meat; in other words, the pressing roller mounted together with the squeezing wheel can provide a perfect peeling result.

According to the aforesaid description, it is deemed that the peeling machine has the features of a high efficiency in peeling and a low percentage of drawbacks, and of providing a complete peeled shrimp. The present invention is so developed in order to improve the drawbacks of the conventional peeling machines, in which the shrimp tail portion is subject to being cut off, aside from some fragmental shell being often left in the peeled shrimp.

We claim:

1. An automatic size-grading and peeling machine for shrimps comprising a plate-partition conveyer, a slanting platform, an automatic grading machine a machine supporting frame, a plurality of feeding pipes mounted on said automatic grading machine; said plate-partition conveyer being fastened to said slanting platform; at least three or conveying screw shafts mounted on said slanting platform being used to connect said plate-partition conveyer and said feeding pipes, a peeling machine, said automatic grading machine being mounted on said machine supporting frame so as to have a plurality of feeding ports mounted over said peeling machine; said peeling machine including a plurality of small and large peeling rollers, a plurality of squeezing wheels, plurality, of squeezing belts and weight assemblies; said peeling machine having at least three peeling units each, of which includes one of a said large peeling rollers and two of said small peeling rollers; said peeling machine further comprising a pressing roller and at least one squeezing wheel being mounted between two of said small peeling rollers; said squeezing wheel and said pressing roller being mounted perpendicular to and over said small peeling roller.

2. An automatic size-grading and peeling machine for shrimps as claimed in claim 1, wherein said spindle is not directly fastened to a bearing block, but both ends of said squeezing wheel being mounted in two bearing sleeves, and a lifting arm and a ⊓-shaped regulating frame being mounted on said spindle; the gravity center of said ⊓-shaped regulating frame having a spring to support said weighted rack, on which an adjusting screw being mounted.

3. An automatic size-grading and peeling machine for shrimps as claimed in claim 1, wherein there are at least two said squeezing wheels mounted on a mounting seat; all said squeezing wheels being mounted inside said squeezing belt, and one said squeezing wheel being mounted with a spindle, and said squeezing wheel having a bearing block in which a weight assembly being mounted; an adjusting rod with an adjusting knob being furnished in said weight assembly, and said adjusting rod being in parallel with said squeezing wheel.

4. An automatic size-grading and peeling machine for shrimps as claimed in claim 1, wherein said squeezing wheel is made of rubber or metal, and the surface of said squeezing wheel being designed into various coarse conditions.

5. An automatic size-grading and peeling machine for shrimps as claimed in claim 1, wherein said squeezing wheel with a weighted rack includes a lifting arm and a ⊓-shaped regulating frame, and an adjusting space between said lifting arm and said ⊓-shaped regulating frame for adjusting a screw to vary a force applied to said squeezing wheel.

6. An automatic size-grading and peeling machine for shrimps as claimed in claim 1, wherein a squeezing belt edge has a gap, and V-shaped ribs in the center part thereof.

7. An automatic size-grading and peeling machine for shrimps as claimed in claim 1, wherein said squeezing wheel includes a convex type and a grooved type.

* * * * *